(12) United States Patent
Kajiyama (10) Patent No.: US 10,807,278 B2
(45) Date of Patent: Oct. 20, 2020

(54) METHOD FOR PRODUCING FIBER-REINFORCED COMPOSITE MATERIAL AND FORMING MOLD USED FOR THE METHOD

(71) Applicant: SUBARU CORPORATION, Tokyo (JP)

(72) Inventor: Tsutomu Kajiyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 233 days.

(21) Appl. No.: 15/891,695

(22) Filed: Feb. 8, 2018

(65) Prior Publication Data
US 2018/0264685 A1 Sep. 20, 2018

(30) Foreign Application Priority Data
Mar. 14, 2017 (JP) .................... 2017-048107

(51) Int. Cl.
| | | |
|---|---|---|
| B29B 15/10 | (2006.01) | |
| B29C 39/10 | (2006.01) | |
| B29C 70/48 | (2006.01) | |
| B29K 63/00 | (2006.01) | |
| B29C 70/10 | (2006.01) | |
| B29C 70/62 | (2006.01) | |

(52) U.S. Cl.
CPC ............ B29B 15/105 (2013.01); B29C 39/10 (2013.01); B29C 70/10 (2013.01); B29C 70/48 (2013.01); B29C 70/62 (2013.01); B29K 2063/00 (2013.01)

(58) Field of Classification Search
None
See application file for complete search history.

(56) References Cited

U.S. PATENT DOCUMENTS

| | | | | |
|---|---|---|---|---|
| 4,000,229 A | * | 12/1976 | Wainer ............... | B29C 45/0005 264/437 |
| 2013/0093414 A1 | * | 4/2013 | Muto ..................... | G01L 3/104 324/207.25 |
| 2013/0309435 A1 | * | 11/2013 | Boursier ............... | B29C 70/84 428/53 |
| 2013/0309488 A1 | * | 11/2013 | Fukami ................. | B44D 5/10 428/338 |

(Continued)

FOREIGN PATENT DOCUMENTS

| | | | | |
|---|---|---|---|---|
| JP | 03097514 A | * | 4/1991 | ......... B29C 45/0013 |
| JP | H7-266374 A | | 10/1995 | |

(Continued)

*Primary Examiner* — Peter L Vajda
*Assistant Examiner* — Paul Spiel
(74) *Attorney, Agent, or Firm* — Troutman Pepper Hamilton Sanders LLP (57) ABSTRACT

In a method for producing a fiber-reinforced composite material, the fiber-reinforced composite material is formed by impregnating a reinforcing fiber sheet with a resin and curing the resin. The method includes: storing the reinforcing fiber sheet in a cavity of a forming mold; and impregnating the reinforcing fiber sheet with the resin by injecting the resin into the cavity of the forming mold, and curing the resin. In the impregnating and curing, the resin containing a magnetic powder is injected into the cavity, and a magnetic field is generated in the cavity to cause the resin containing the magnetic powder to flow.

11 Claims, 6 Drawing Sheets

(56) References Cited

U.S. PATENT DOCUMENTS

| | | | |
|---|---|---|---|
| 2014/0272119 A1* | 9/2014 | Kushalappa | B29C 70/62 |
| | | | 264/429 |
| 2018/0211767 A1* | 7/2018 | Lee | H01F 27/2885 |
| 2018/0374618 A1* | 12/2018 | Takada | H01F 1/147 |
| 2019/0157951 A1* | 5/2019 | Yamamoto | B29C 45/0025 |

FOREIGN PATENT DOCUMENTS

| | | |
|---|---|---|
| JP | 2008-179130 A | 8/2008 |
| JP | 2016-10926 A | 6/2014 |

\* cited by examiner

METHOD FOR PRODUCING FIBER-REINFORCED COMPOSITE MATERIAL AND FORMING MOLD USED FOR THE METHOD

CROSS-REFERENCE TO RELATED APPLICATIONS

The present application claims priority from Japanese Patent Application No. 2017-048107 filed on Mar. 14, 2017, the entire contents of which are hereby incorporated by reference.

BACKGROUND

1. Technical Field

The present invention relates to methods for producing fiber-reinforced composite materials, and more particularly to a method for producing a fiber-reinforced composite material, which method involves adequately impregnating a reinforcing fiber sheet with a resin using magnetic force when the reinforcing fiber sheet is impregnated with the resin inside a forming mold before resin curing.

2. Related Art

In recent years, resin transfer molding (RTM), reaction injection molding (RIM), and other methods have been used as methods for producing fiber-reinforced composite materials. In these methods, a stacked body including stacked reinforcing fiber sheets is set in a mold. After mold clamping, the stacked body is impregnated with an uncured resin by injection of the resin, and the resin is cured. Since these methods each involve shaping a stacked body formed of a dry base material that is not impregnated with a resin, these methods enable production of a molded article having a relatively complex shape.

However, reinforcing fiber sheets before impregnation with a resin are difficult to handle because, for example, stacked reinforcing fiber sheets are disorganized during transport. Therefore, a preliminary shaping step is normally provided before main shaping including impregnation with a resin (Japanese Unexamined Patent Application Publication (JP-A) No. 2008-179130).

In the preliminary shaping step, one reinforcing fiber sheet is set in a mold for preliminary shaping, a powder binder is applied to the surface of the sheet, and another reinforcing fiber sheet is stacked thereon. This process is repeated to form a stacked body of reinforcing fiber sheets, followed by mold clamping using the mold for preliminary shaping. The mold clamping causes the reinforcing fiber sheets to bond together and forms a preform that is preliminarily shaped in a form suitable for subsequent main shaping. In the main shaping step, the preform in a mold for main shaping is set, which facilitates positioning and avoids misalignment in main shaping.

However, JP-A No. 7-266374 and JP-A No. 2016-10926 disclose methods for producing fiber-reinforced composite materials by way of resin forming using magnetic force. In JP-A No. 7-266374, the formation of an FRP component using a mold involves disposing a magnet in a forming mold and injecting a melted resin containing a magnetic powder into the forming mold. The magnetic powder is thus concentrated around the magnet to improve the wear resistance of the part where the magnetic powder is concentrated. In JP-A No. 2016-10926, preliminary shaping involves interposing a fiber-reinforced base material between magnetic inserts and magnets and inserting the inserts into cavities of a mold to curve the fiber-reinforced base material in conformance with the mold.

However, the method for producing a fiber-reinforced composite material, in which preliminary shaping is performed before the main shaping step, as described above in JP-A No. 2008-179130 is associated with complex production processes and high production costs due to an increased number of molds used for production.

A measure to address this issue may involve setting a reinforcing fiber sheet in a mold without the preliminary shaping process described above; impregnating the reinforcing fiber sheet with a resin by injection of the resin into the mold; and then curing the injected resin in the mold.

If a reinforcing fiber sheet is impregnated with a resin by injection of the resin into a mold without such preliminary shaping before resin curing, there is a risk that the reinforcing fiber sheet in the shape complex parts of the mold may include a non-impregnated region not impregnated adequately with the resin. If resin injection ports are formed in complex parts of a forming mold in order to avoid such an issue, the shape of the forming mold will become more complex, and the control process in resin injection will be complicated. As a result, the production costs may increase.

The forming method described in JP-A No. 7-266374 uses the magnet installed in the cavity of the mold in order to concentrate the magnetic powder. This method, however, is not intended to improve the fluidity of the resin and thus does not solve the issue of generation of a non-impregnated region. The forming method described in JP-A No. 2016-10926 uses magnetic force in order only to form the fiber-reinforced base material into a certain shape inside the mold. This method is also not intended to improve the fluidity of the resin and does not solve the issue of generation of a non-impregnated region.

SUMMARY OF THE INVENTION

It is desirable to provide a method for producing a fiber-reinforced composite material. In the method, a magnetic field is generated inside a mold while a reinforcing fiber sheet is impregnated with a resin before resin curing. The generation of the magnetic field causes the resin to flow appropriately in the mold and ensures that the reinforcing fiber sheet is filled with the resin.

An aspect of the present invention provides a method for producing a fiber-reinforced composite material, in which method the fiber-reinforced composite material is formed by impregnating a reinforcing fiber sheet with a resin and curing the resin. The method includes: storing the reinforcing fiber sheet in a cavity of a forming mold; and impregnating the reinforcing fiber sheet with the resin by injecting the resin into the cavity of the forming mold, and curing the resin. In the impregnating and curing, the resin containing a magnetic powder is injected into the cavity, and a magnetic field is generated in the cavity to cause the resin containing the magnetic powder to flow.

BRIEF DESCRIPTION OF THE DRAWINGS

FIGS. 1A and 1B are views of a fiber-reinforced composite material produced by a method for producing a fiber-reinforced composite material according to an example of the present invention, where

FIGS. 6A and 6B are views illustrating a method for producing a fiber-reinforced composite material according to another example of the present invention, where

DETAILED DESCRIPTION

A method for producing a fiber-reinforced composite material 10 according to an example of the present invention will be described below in detail with reference to the drawings. In the following description, the same reference numbers are basically used for the same components, and repeated description is omitted.

Figure 1A:
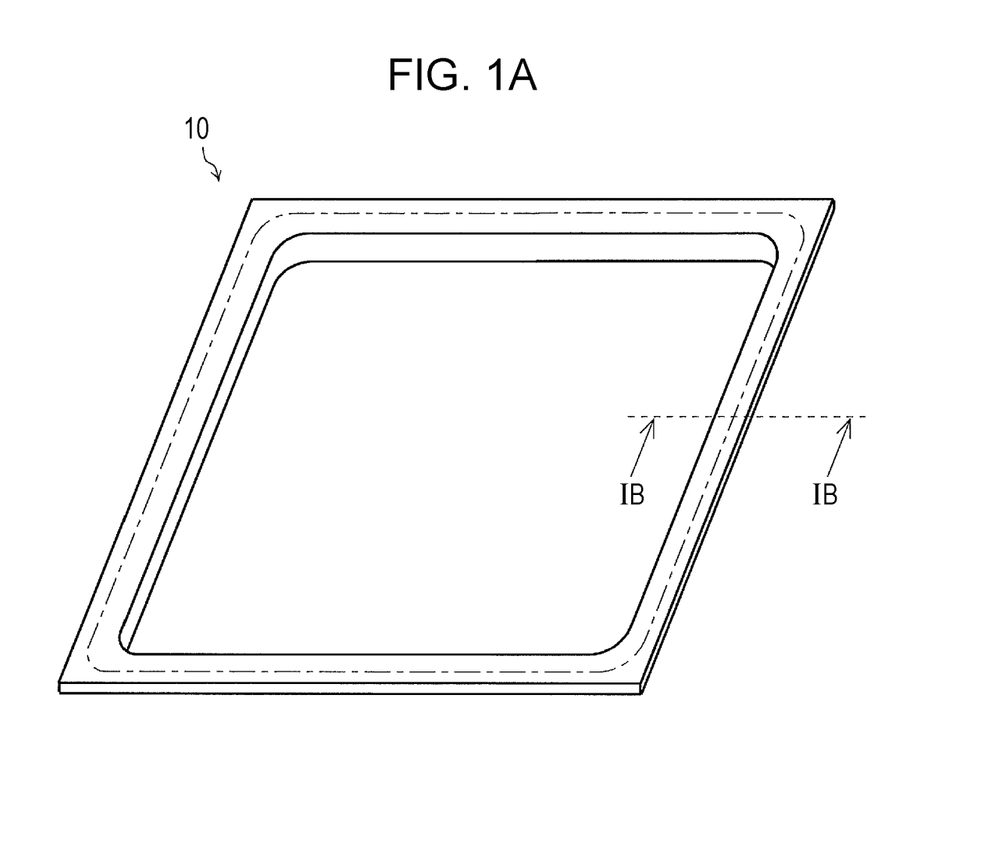
FIG. 1A is a perspective view and FIG. 1B is a sectional view.
Figure 1B:
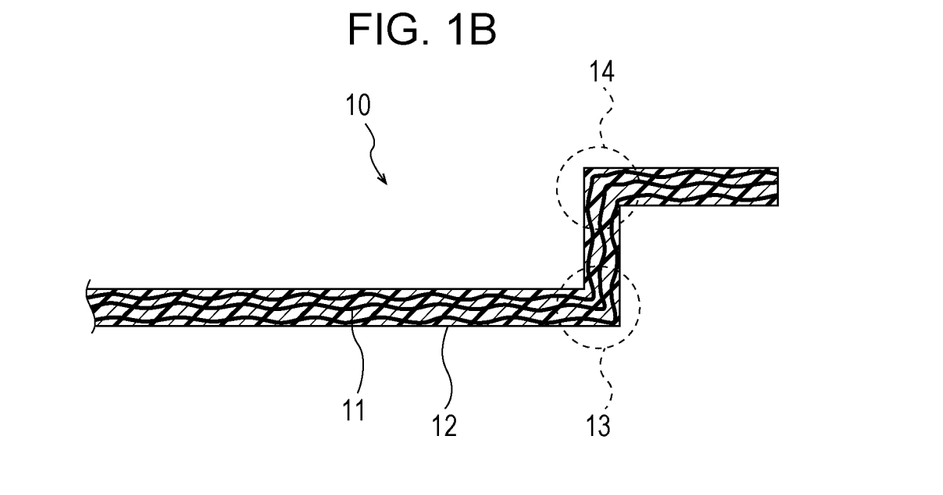

Referring to FIGS. 1A and 1B, the fiber-reinforced composite material 10 produced by the method for producing the fiber-reinforced composite material 10 according to this example will be described. FIG. 1A is a perspective view generally illustrating the fiber-reinforced composite material 10. FIG. 1B is a sectional view taken along line IB-IB in FIG. 1A.

The fiber-reinforced composite material 10 illustrated in FIG. 1A is, for example, a carbon fiber reinforced plastic (CFRP) and has a substantially tray shape as an example. FIG. 1A illustrates the fiber-reinforced composite material 10 just after taken out of the forming mold upon completion of the forming step described below. The fiber-reinforced composite material 10 is cut along the long dashed short dashed line defined in a peripheral part after the completion of the forming step. A region of the fiber-reinforced composite material 10 inside the long dashed short dashed line is a product region serving as a product. The fiber-reinforced composite material 10 having such a configuration is used as, for example, a component for vehicles, such as cars.

Referring to FIG. 1B, the fiber-reinforced composite material 10 includes a reinforcing fiber sheet 11 and a resin 12 with which the reinforcing fiber sheet 11 has been impregnated and which has been cured.

Examples of the reinforcing fiber in the reinforcing fiber sheet 11 include carbon fibers, glass fibers, and aramid fibers. The reinforcing fiber sheet 11 may be in the form of a fabric material, such as textile or knitted fabric, or a unidirectional material (UD material). The reinforcing fiber sheet 11 is a stacked body including sheets of reinforcing fiber stacked.

The resin 12 may be a thermosetting resin, such as epoxy resin, or a thermoplastic resin, such as polyamide (PA) or polypropylene (PP). The resin 12 has been cured with the reinforcing fiber sheet 11 impregnated with the resin 12.

The resin 12 according to this example contains a magnetic powder formed of a magnetic material, such as iron powder. The proportion of the magnetic powder in the resin 12 is such that the externally acting magnetic force can increase the fluidity of the resin 12 but does not degrade the properties, such as strength, of the cured resin 12. The particle size of the magnetic powder is such that the reinforcing fiber sheet 11 is assuredly impregnated with the resin 12. The addition of the magnetic powder to the resin 12 results in a rough surface of the fiber-reinforced composite material because of the magnetic powder present near the surface of the resin 12. When the fiber-reinforced composite material 10 is bonded to other component using an adhesive, such a configuration can increase the adhesion strength between the adhesive and the fiber-reinforced composite material 10 and can increase the bonding strength between the fiber-reinforced composite material 10 and other component.

The fiber-reinforced composite material 10 according to this example has an electromagnetic shielding function because of the reinforcing fiber sheet 11 made of, for example, carbon fiber. Moreover, the fiber-reinforced composite material 10 according to this example has an enhanced electromagnetic shielding function because of the magnetic powder, such as iron powder, present in the resin 12.

Figure 2:
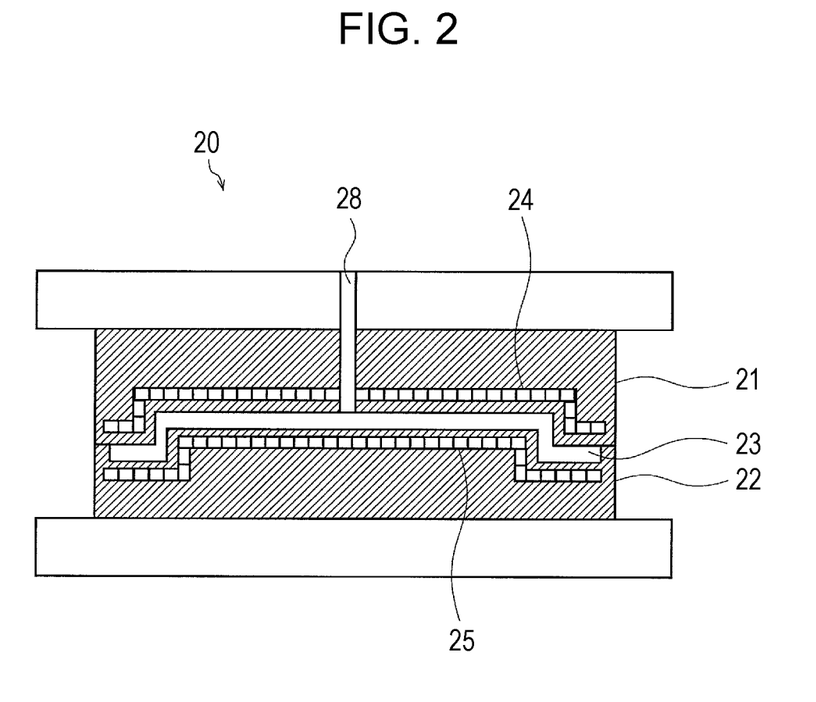
FIG. 2 is a sectional view of a forming mold used in the method for producing a fiber-reinforced composite material according to the example of the present invention.

Referring to FIG. 2, a forming mold 20 used in the method for producing the fiber-reinforced composite material 10 according to this example will be described. The forming mold 20 includes an upper mold 21 and a lower mold 22. The upper mold 21 and the lower mold 22 form a cavity 23 as a gap therebetween when closed. The cavity 23 has the same shape as the fiber-reinforced composite material 10 produced in this example.

An injection port 28 is formed to penetrate the upper mold 21. A liquid or low-viscosity resin is fed to the forming mold 20 through the injection port 28 from outside. In this case, one injection port 28 is formed in the central part of the upper mold 21. The injection port 28 may be formed in the peripheral part of the upper mold 21, or a plurality of injection ports 28 may be formed. The injection port 28 may be formed in the lower mold 22.

The forming mold 20 according to this example includes magnets 24 and 25 along the inner walls facing the cavity 23 to ensure that the resin 12 containing the magnetic powder flows appropriately. Specifically, the upper mold 21 includes an array of magnets 24 disposed from the injection port 28 toward the peripheral part of the cavity 23. Similarly, the lower mold 22 includes an array of magnets 25 disposed from the injection port 28 toward the peripheral part of the cavity 23. The magnets 24 and 25 may be permanent magnets or electromagnets. As described below, the magnets 24 and 25 disposed in the forming mold 20 allow the liquid or semi-solid uncured resin 12 containing the magnetic powder to flow appropriately inside the cavity 23.

The magnets 24 disposed in the upper mold 21 may be fixed in position or may be movable. When the magnets 24 are fixed in position, the magnets are disposed in storage holes (not illustrated) formed in the upper mold 21. When the magnets 24 are movable, the magnets 24 are moved, for example, from the injection port 28 toward the peripheral part using a driving unit (not illustrated), such as a motor, disposed in the upper mold 21. The same configuration applies to the magnets 25 disposed in the lower mold 22.

When electromagnets are used as the magnets 24 and 25, the energization of the electromagnets and the energization power are controlled by a controller (not illustrated). Specifically, the magnets 24 and 25 are energized to generate the magnetic field while a current is supplied to the magnets 24 and 25 from the controller (not illustrated). The magnets 24 and 25 are not energized and the magnetic field is not produced while no current is supplied to the magnets 24 and 25 from the controller (not illustrated).

Referring to FIGS. 3A to 4C, the forming step of producing the fiber-reinforced composite material 10 using the forming mold 20 having the above-described configuration will be described. The forming step may be referred to as a shaping step. In this case, electromagnets are used as the magnets 24 and 25 embedded in the forming mold 20, and the electromagnets are energized to generate the magnetic field, so that the resin 12 flows appropriately inside the cavity 23. The description of this case will be provided here.

Figure 3A:
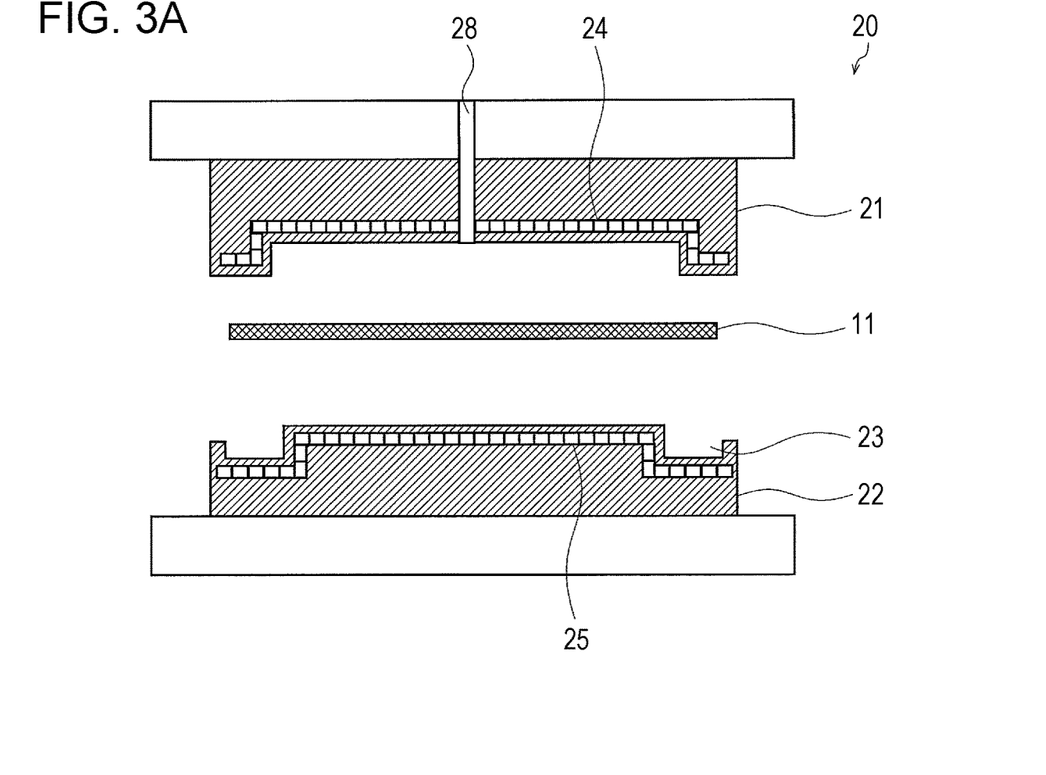
FIGS. 3A and 3B are sectional views illustrating the method for producing a fiber-reinforced composite material according to the example of the present invention.

Referring to FIG. 3A, the reinforcing fiber sheet 11 is first stored between the upper mold 21 and the lower mold 22. Here, the reinforcing fiber sheet 11 is placed in a predetermined position of the forming mold 20 while the reinforcing fiber sheet 11 is in the form of a stacked body including sheets of fiber material stacked instead of being in the form of a preform obtained by preliminary shaping.

Figure 3B:
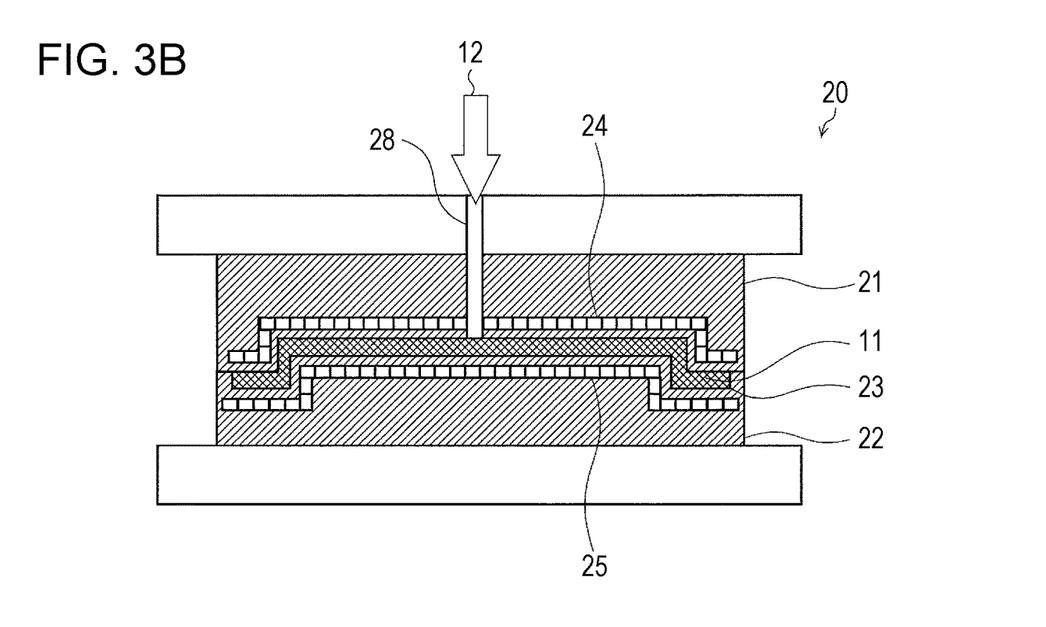

Referring to FIG. 3B, the upper mold 21 and the lower mold 22 are then brought into contact with each other. The reinforcing fiber sheet 11 is thus stored in the cavity 23 formed as a gap between the upper mold 21 and the lower mold 22. In this state, the resin 12 is then injected into the cavity 23 through the injection port 28, so that the reinforcing fiber sheet 11 is impregnated with the resin 12 inside the cavity 23. The liquid or low-viscosity resin 12 injected into the cavity 23 contains a magnetic powder, such as iron powder.

Figure 4A:
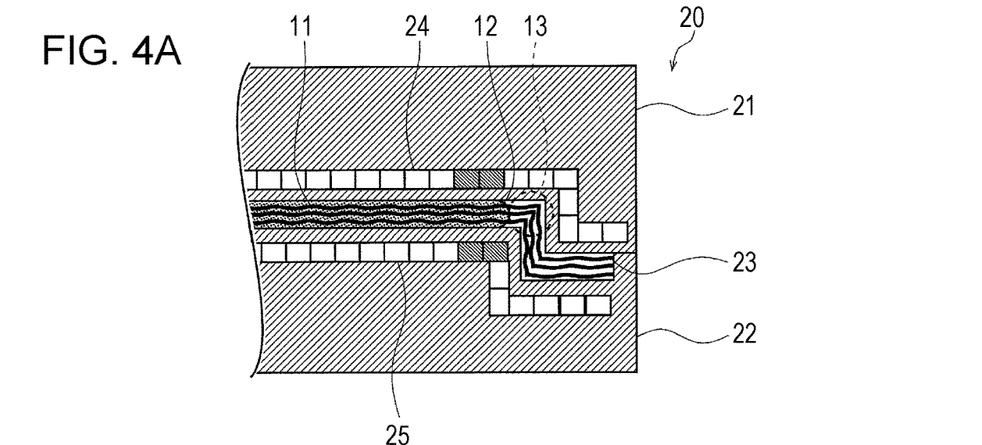
FIGS. 4A, 4B, and 4C are enlarged sectional views illustrating the method for producing a fiber-reinforced composite material according to the example of the present invention.
Figure 4B:
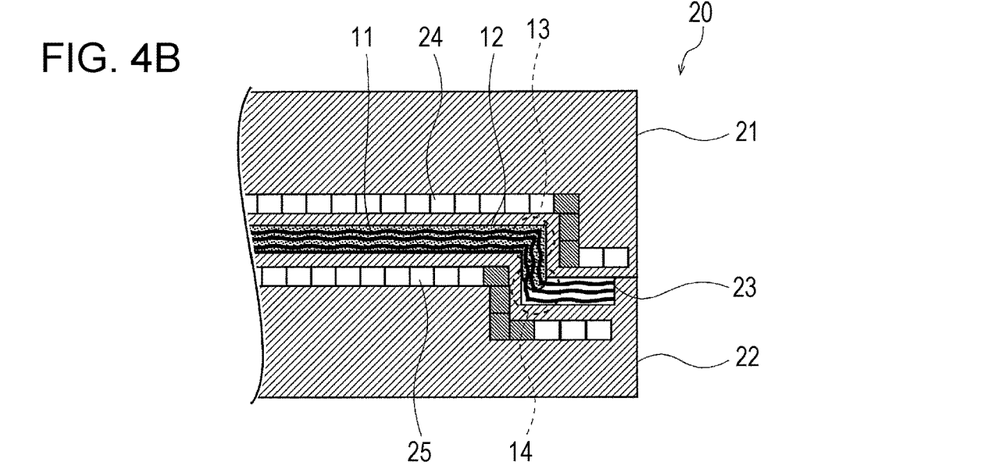
Figure 4C:
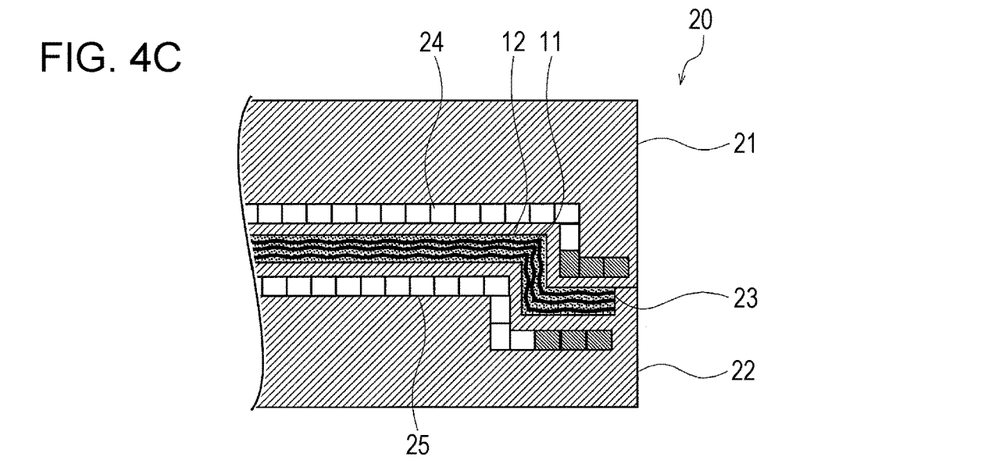

Referring to FIGS. 4A to 4C, the step of causing the resin 12 to flow inside the cavity 23 will be described. FIGS. 4A to 4C are enlarged sectional views sequentially illustrating this step. Here, the case where the resin 12 is caused to flow from the central part of the cavity 23 toward the peripheral part will be described. In these figures, the magnets 24 and 25 that are being energized to generate the magnetic field are indicated by hatching.

When the magnets 24 and 25, electromagnets, are energized from the central part toward the peripheral part in this example, the magnetic field generated by the magnets 24 and 25 acts on the magnetic powder in the resin 12, and the magnets 24 and 25 attract the resin 12 so that the resin 12 flows toward the peripheral part of the cavity 23. The magnetic force of the magnetic field generated by the magnets 24 and 25 is appropriately controlled by applying a pulse wave to the magnets 24 and 25.

Referring to FIG. 4A, the magnetic field is generated by energizing the magnets 24 and 25 disposed on the inner side (the left side in the figure) of a bent part 13 illustrated in FIG. 1B. The magnetic force due to the magnetic field causes the resin 12 containing the magnetic powder to flow from the central part of the cavity 23 toward the peripheral part.

Referring to FIG. 4B, the resin 12 containing the magnetic powder is then brought to the bent parts 13 and 14 by energizing the magnets 24 and 25 positioned to oppose each other across the bent parts 13 and 14. Since the bent parts 13 and 14 are located in the parts of the cavity 23 that are bent at substantially right angles, it is difficult to impregnate the reinforcing fiber sheet 11 in the bent parts 13 and 14 with the resin 12 and cause the resin to flow in the bent parts 13 and 14. In this example, the magnetic force of the magnetic field generated by the magnets 24 and 25 positioned to oppose each other across the bent parts 13 and 14 causes the resin 12 containing the magnetic powder to flow along the bent parts 13 and 14. Therefore, the reinforcing fiber sheet 11 is adequately impregnated with the resin 12 even in the parts of the cavity 23 that are bent at substantially right angles, and the resin 12 is allowed to flow toward the peripheral part of the cavity 23.

Referring to FIG. 4C, the magnets 24 and 25 disposed in the periphery of the forming mold 20 are energized. Such energization causes the peripheral part of the cavity 23 to be still filled with the resin 12 containing the magnetic powder while the reinforcing fiber sheet 11 is impregnated with the resin 12 containing the magnetic powder. As a result, the reinforcing fiber sheet 11 in the entire region of the cavity 23 is impregnated with the resin 12. Thus, the formation of a non-impregnated region, which is a region not impregnated with the resin 12, in the reinforcing fiber sheet 11 is suppressed.

After completion of the above-described filling step, the resin 12 is cured inside the cavity 23. When the resin 12 is a thermosetting resin, such as epoxy resin, the resin 12 is cured by heating the resin 12 to about 100° C. or higher. Since the resin 12 in this example contains the magnetic powder, such as iron powder, the resin 12 can be thermally cured by induction heating. When the resin 12 is a thermoplastic resin, such as polypropylene, the resin 12 is cured by cooling the resin 12 to 20° C. to 60° C. or lower (preferably, for example, about 40° C.)

After the resin 12 is cured well inside the cavity 23, the upper mold 21 and the lower mold 22 are separated from each other. The fiber-reinforced composite material 10 illustrated in FIG. 1A is then taken out.

In the foregoing description, the resin 12 containing the magnetic powder is caused to flow appropriately as follows: disposing the magnets 24 and 25, electromagnets, throughout the cavity 23; and supplying a current sequentially to the magnets 24 and 25 to energize the magnets 24 and 25. Alternatively, another method may be employed to generate the magnetic field and to cause the resin 12 to flow.

For example, the magnets 24 and 25, electromagnets or permanent magnets, may be disposed only near the bent parts 13 and 14 illustrated in FIG. 4A to improve the fluidity of the resin 12 in the cavity 23 in and near the bent parts 13 and 14.

Alternatively, the magnets 24 and 25, permanent magnets, may be moved from the central part of the cavity 23 toward the peripheral part, and the resin 12 containing the magnetic powder may be caused to flow appropriately toward the peripheral part by means of the magnetic force of the moving magnets 24 and 25.

Figure 5A:
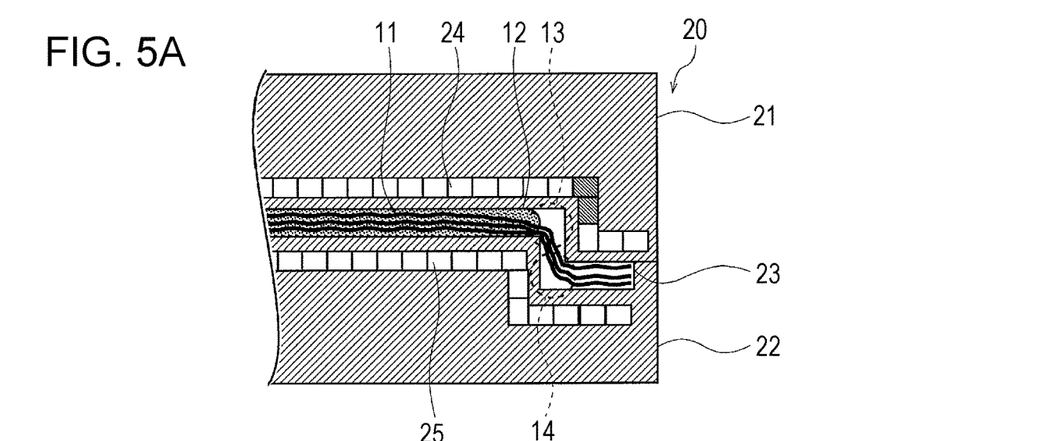
FIGS. 5A, 5B, and 5C are enlarged sectional views illustrating the method for producing a fiber-reinforced composite material according to another example of the present invention.
Figure 5B:
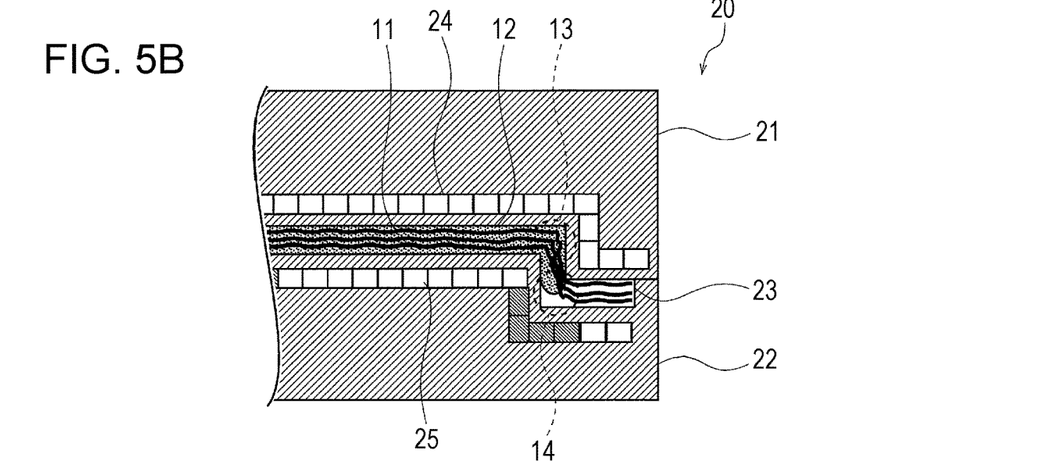
Figure 5C:
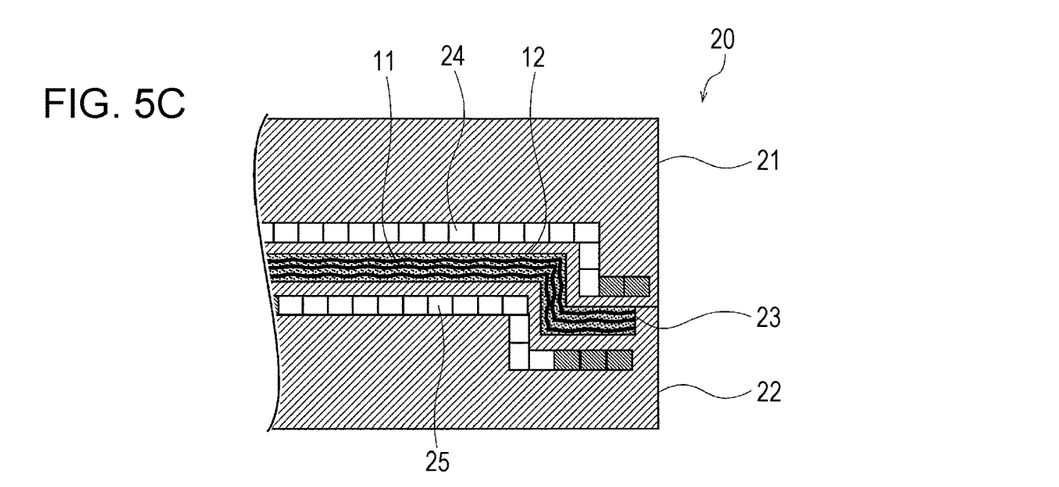

Referring FIGS. 5A to 5C, a forming method according to another example will be described. FIG. 5A, FIG. 5B, and FIG. 5C are sectional views sequentially illustrating the forming method according to another example. In this example, the shape of the reinforcing fiber sheet 11 inside the cavity 23 is corrected by controlling the flow of the resin 12 with the magnetic field when filling the cavity 23 with the resin 12.

Referring to FIG. 5A, when the reinforcing fiber sheet 11 is stored in the cavity 23 of the forming mold 20, the reinforcing fiber sheet 11 is not evenly positioned in the bent parts 13 and 14 because of poor conformability of the reinforcing fiber sheet 11. Specifically, in the bent part 13, the reinforcing fiber sheet 11 is concentrated in the lower part of the cavity 23. In the bent part 14, the reinforcing fiber sheet 11 is concentrated in the upper part of the cavity 23. When the resin 12 is charged into the bent parts 13 and 14 and cured in this state, the uneven distribution of the reinforcing fiber sheet 11 may reduce the strength of the fiber-reinforced composite material 10 to be produced. Here, the uneven distribution of the reinforcing fiber sheet 11 inside the cavity 23 is corrected by causing the resin 12 containing the magnetic powder to flow in a predetermined direction using the magnetic force generated by the magnets 24 and 25.

Specifically, when the resin 12 injected through the injection port 28 (not illustrated here) comes to near the bent part 13, the magnetic field is generated by energizing the magnets 24 disposed directly outside the bent part 13 (on the right side in the figure). The resin 12 containing the magnetic powder is thus caused to flow inside the cavity 23 toward the outside (toward the right side in the figure). The force for moving the reinforcing fiber sheet 11 toward the outside (toward the right side in the figure) thus acts in and near the bent part 13 in association with the flow of the resin 12. As a result, the reinforcing fiber sheet 11 is shaped in conformance with the shape of the bent part 13. Simultaneously, the reinforcing fiber sheet 11 in and near the bent part 13 is impregnated with the resin 12. At this time, the magnets 25 of the lower mold 22 are not necessarily energized.

Referring to FIG. 5B, the resin 12 containing the magnetic powder is then caused to flow downward by energizing the magnets 25 disposed below the bent part 14 and on the inner side (the left side in the figure) of the bent part 14. The force for moving the reinforcing fiber sheet 11 obliquely downward thus acts in and near the bent part 14 in association with the flow of the resin 12. As a result, the reinforcing fiber sheet 11 is shaped in conformance with the shape of the bent part 14. Simultaneously, the reinforcing fiber sheet 11 in and near the bent part 14 is impregnated with the resin 12. At this time, the magnets 24 of the upper mold 21 are not necessarily energized.

Referring to FIG. 5C, the magnets 24 and 25 disposed in the peripheral part of the forming mold 20 are finally energized to generate the magnetic field. The resin 12 reaches the periphery of the cavity 23 accordingly.

After completion of the foregoing step, a curing process for curing the resin 12 is performed. The fiber-reinforced composite material 10 illustrated in FIGS. 1A and 1B is then taken out of the forming mold 20.

According to the production method, the reinforcing fiber sheet 11 can be deformed in conformance with the inner shape of the cavity 23 by controlling the magnetic field generated by the magnets 24 and 25. The position of the reinforcing fiber sheet 11 inside the fiber-reinforced composite material 10 can be corrected accordingly, improving the strength of the fiber-reinforced composite material 10.

Figure 6A:
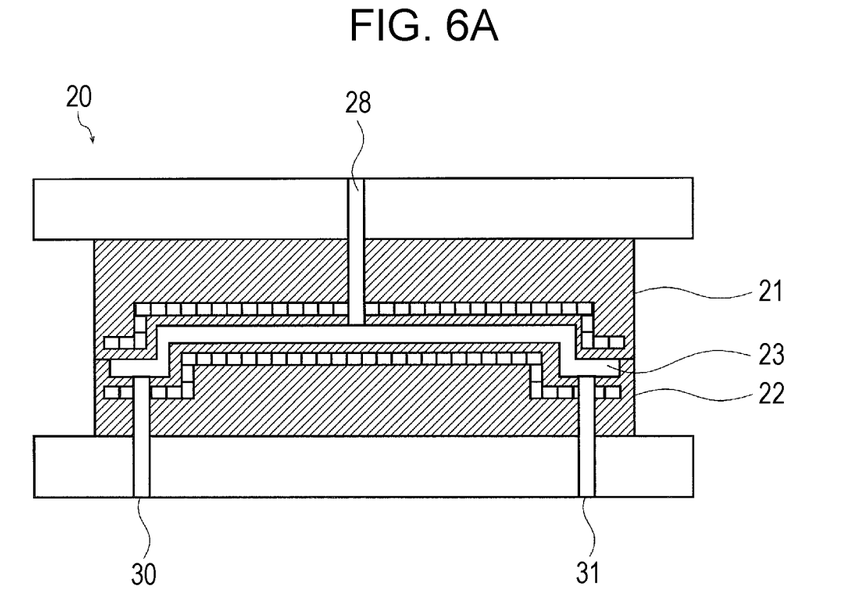
FIG. 6A is a sectional view of a forming mold.
Figure 6B:
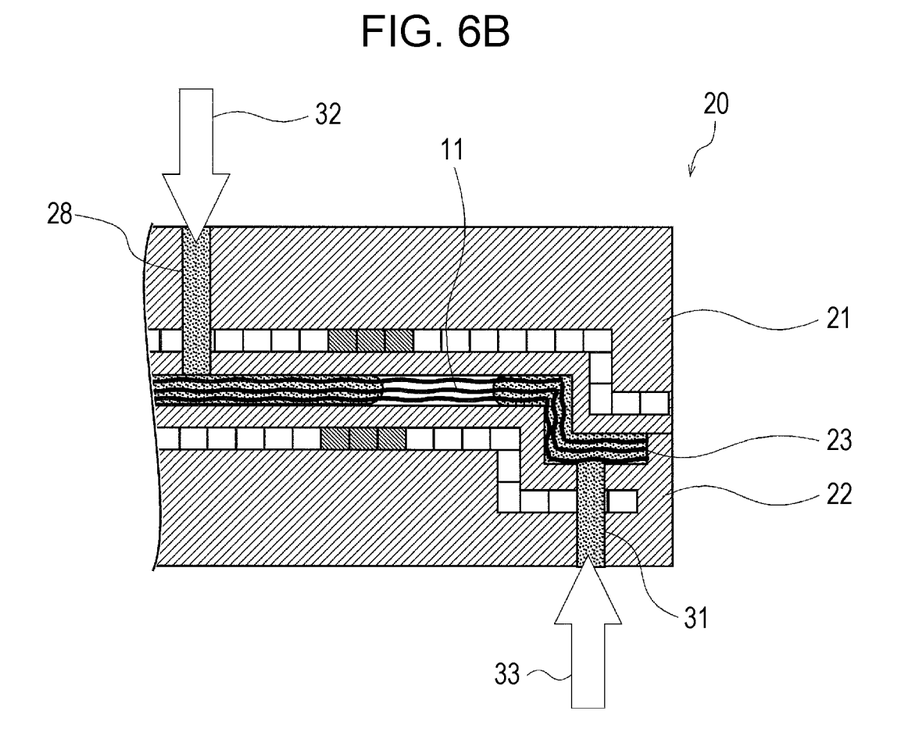
FIG. 6B is an enlarged sectional view illustrating the method for forming the fiber-reinforced composite material using the forming mold.

FIG. 6A is a sectional view illustrating a forming method according to another example, and FIG. 6B is an enlarged sectional view illustrating the forming method. In this example, a resin having a different composition is injected into a cavity 23 from each of an upper mold 21 and a lower mold 22.

Referring to FIG. 6A, a forming mold 20 used here includes the upper mold 21 and the lower mold 22 in the same manner as described above. The forming mold 20 has, for example, a plurality of injection ports 28 through which the resins are to be injected into the cavity 23. Specifically, the upper mold 21 has an injection port 28 in its central part, and the lower mold 22 has two injection ports 30 and 31 in its peripheral part. As describes below, a resin 32 containing a magnetic powder is injected through the injection port 28 (first injection port), and a resin 33 containing an additive powder other than the magnetic powder is injected through the injection ports 30 and 31 (second injection ports).

Referring to FIG. 6B, the resin 32 is injected into the cavity 23 through the injection port 28 formed in the upper mold 21. Since the resin 32 contains the magnetic powder, the magnetic field generated by the magnets 24 and 25 embedded in the forming mold 20 causes the resin 32 to flow appropriately toward the peripheral part of the cavity 23.

Through the injection port 31 formed in the peripheral part of the lower mold 22, the resin 33 containing an additive powder, such as ceramic powder, alumina powder, or glass powder, is injected into the cavity 23. The resin 33 injected through the injection port 31 is charged into the peripheral part of the cavity 23. Charging the resin 33 containing an additive powder into the peripheral part of the cavity 23 will form a fine rough surface, which is attributed to the presence of the additive powder, on the surface of the fiber-reinforced composite material 10 to be produced. When an adhesive is applied to the rough surface of the fiber-reinforced composite material 10 for bonding the fiber-reinforced composite material 10 to other component using the adhesive, an anchor effect is generated between the adhesive and the rough surface, improving the bonding strength between the fiber-reinforced composite material 10 and other component.

In the case of using a thermosetting resin, such as epoxy resin, in the multi-point injection method described above, the viscosity of the resin at the time of injection is relatively low. In the case of using a thermoplastic resin, such as polypropylene (PP), the viscosity of the resin at the time of injection is so high that a weld line where the flows meet tends to form. The mechanical strength of the resin near the weld line may be low, which affects appearance quality. To control the position of the weld line, the timings for injecting the resin 32 and the resin 33 are controlled, so that a weld line can be formed in a part other than the part on which a relatively large external force acts.

In this example, in an area where the resin 32 injected from the central part and the resin 33 injected from the peripheral part meet, the formation of a welded line can be suppressed by moving the resin in this area with the magnets 24 and 25. This results in high mechanical strength and good appearance quality in the area where the resin 32 and the resin 33 meet.

After completion of the injection step, the resins 32 and 33 with which the reinforcing fiber sheet 11 has been impregnated is cured inside the cavity 23 by a heat treatment or the like. The upper mold 21 and the lower mold 22 are separated from each other, and the fiber-reinforced composite material 10 illustrated in FIGS. 1A and 1B is then taken out.

The examples of the present invention will be described below, but the present invention is not limited to these examples.

Advantageous Effects of Invention

An aspect of the present invention provides a method for producing a fiber-reinforced composite material. The fiber-reinforced composite material is formed by impregnating a reinforcing fiber sheet with a resin and curing the resin. The method includes a storing step of storing the reinforcing fiber sheet in a cavity of a forming mold; and a forming step of impregnating the reinforcing fiber sheet with the resin by injecting the resin into the cavity of the forming mold, and curing the resin. In the forming step, the resin containing a magnetic powder is injected into the cavity, and a magnetic field is generated in the cavity to cause the resin containing the magnetic powder to flow. Since the generation of the magnetic field in the cavity causes the resin containing the magnetic powder to flow in a predetermined direction, it is possible to suppress formation of voids and ensure that the reinforcing fiber sheet is filled with the resin.

The magnetic field may be generated such that the resin containing the magnetic powder flows toward a bent part of the reinforcing fiber sheet. Although it is generally difficult to impregnate the bent part of the reinforcing fiber sheet with the resin, this method ensures that the bent part of the reinforcing fiber sheet is filled and impregnated with the resin using the magnetic field.

The magnetic field may be generated by electromagnets provided in the forming mold. When the magnetic field for causing the resin to flow is generated by electromagnets, the strength and direction of the magnetic field can be controlled properly and the resin can flow appropriately inside the cavity.

The forming mold may have a first injection port and a second injection port. The resin containing the magnetic powder may be injected into the cavity through the first injection port. A resin containing an additive powder formed of a material different from a material of the magnetic powder may be injected into the cavity through the second injection port. When the additive powder, such as silica powder, is injected into the cavity through the second injection port, the additive powder can roughen a predetermined area of the surface of the fiber-reinforced composite material. The adhesion strength between the roughened surface of the fiber-reinforced composite material and an adhesive can be improved accordingly.

The invention claimed is:

1. A method for producing a fiber-reinforced composite material, the method comprising:
    disposing a reinforcing fiber sheet in a cavity of a forming mold, the forming mold defining a first injection port connected to the cavity and a peripheral part disposed in the cavity apart from the first injection port, the forming mold including a magnet disposed adjacent to the cavity;
    impregnating the reinforcing fiber sheet with a resin containing a magnetic powder by injecting the resin into the cavity through the first injection port; and
    curing the resin,
    wherein, in the impregnating, the magnet generates a moving magnetic field in the cavity to cause the resin to flow;
    wherein the magnet includes at least either one of:
        (i) a movable magnet configured to move in a direction from the first injection port toward the peripheral part; and
        (ii) an array of fixed magnets embedded inside the forming mold and disposed along the direction from the first injection port toward the peripheral part, the array of fixed magnets being configured to be sequentially energized in the direction from the first injection port toward the peripheral part to generate the magnetic field that moves in the direction from the first injection port toward the peripheral part, such that
        a first fixed magnet near the first injection port is initially energized, while a second fixed magnet near the peripheral part is not energized, and
        the second fixed magnet is subsequently energized while the first fixed magnet is not energized.

2. The method for producing a fiber-reinforced composite material according to claim 1, wherein the moving magnetic field is generated such that the resin containing the magnetic powder flows toward a bent part of the reinforcing fiber sheet.

3. The method for producing a fiber-reinforced composite material according to claim 1, wherein the magnet includes electromagnets provided in the forming mold.

4. The method for producing a fiber-reinforced composite material according to claim 2, wherein the magnet includes electromagnets provided in the forming mold.

5. The method for producing a fiber-reinforced composite material according to claim 1, wherein
    the forming mold further defines a second injection port connected to the cavity, and
    a resin containing an additive powder formed of a material different from a material of the magnetic powder is injected into the cavity through the second injection port.

6. The method for producing a fiber-reinforced composite material according to claim 2, wherein
    the forming mold further defines a second injection port connected to the cavity, and
    a resin containing an additive powder formed of a material different from a material of the magnetic powder is injected into the cavity through the second injection port.

7. The method for producing a fiber-reinforced composite material according to claim 3, wherein
    the forming mold further defines a second injection port connected to the cavity, and
    a resin containing an additive powder formed of a material different from a material of the magnetic powder is injected into the cavity through the second injection port.

8. The method for producing a fiber-reinforced composite material according to claim 4, wherein
    the forming mold further defines a second injection port connected to the cavity, and
    a resin containing an additive powder formed of a material different from a material of the magnetic powder is injected into the cavity through the second injection port.

9. The method for producing a fiber-reinforced composite material according to claim 1, wherein the reinforcing fiber sheet includes a stacked body in which sheets of reinforcing fiber are stacked.

10. The method for producing a fiber-reinforced composite material according to claim 1, wherein the forming mold further includes a driving unit, and the movable magnet is moved by the driving unit.

11. A forming mold used for the method for producing the fiber-reinforced composite material according to claim 1, the forming mold comprising the magnet disposed between the first injection port and the peripheral part, and configured to generate the moving magnetic field.

* * * * *